United States Patent [19]

Meier

[11] Patent Number: 4,561,940
[45] Date of Patent: Dec. 31, 1985

[54] OVERCHARGE PREVENTION ARRANGEMENT

[75] Inventor: René Meier, Lucerne, Switzerland

[73] Assignee: Mentec Ag, Luzern, Switzerland

[21] Appl. No.: 629,257

[22] Filed: Jul. 9, 1984

[51] Int. Cl.$^4$ .................... B01D 3/42; F16K 31/18
[52] U.S. Cl. ........................ 202/181; 202/193;
202/196; 202/202; 202/205; 203/1; 203/91;
137/434
[58] Field of Search .............. 202/181, 196, 205, 193,
202/190, 188, 202; 203/91, 1; 137/449, 397,
434, 403; 4/427

[56] References Cited
U.S. PATENT DOCUMENTS

| 790,878 | 5/1905 | Bailey | 137/449 |
|---|---|---|---|
| 987,140 | 3/1911 | Houser | 137/397 |
| 1,890,152 | 12/1932 | Hills | 202/181 |
| 2,720,215 | 10/1955 | Stott | 137/434 |
| 2,756,769 | 7/1956 | Martin et al. | 137/449 |
| 3,558,436 | 1/1971 | Foley et al. | 202/196 |
| 4,185,339 | 1/1980 | Morales | 4/427 |
| 4,192,341 | 3/1980 | Hilmer | 137/449 |
| 4,235,677 | 11/1980 | Karamian | 202/181 |
| 4,419,773 | 12/1983 | Sullivan | 137/403 |

Primary Examiner—S. Leon Bashore
Assistant Examiner—V. Manoharan
Attorney, Agent, or Firm—Werner W. Kleeman

[57] ABSTRACT

The overcharge prevention device is installed in a solvent processing plant in a vacuum evaporator of a heat exchanger. It assures that the level of the cleaning solution in the vacuum evaporator cannot randomly rise when a feed valve malfunctions. A float body of an overcharge valve extending into the vacuum evaporator exerts a pressure through a double-arm lever and a valve plunger upon a ball valve and a valve seat in normal operation and holds the overcharge valve in a closed position. As the level of the cleaning solution undesirably rises, the buoyant action of the cleaning solution acts on the float body, causing the pressure on the valve seat to diminish, and the overcharge valve opens. This permits air to enter into the vacuum evaporator through the overcharge valve. The generated vacuum collapses and the suction force employed to ingest the cleaning solution disappears. Cleaning solution is only delivered to the vacuum evaporator again when the level thereof in the vacuum evaporator has been lowered by draining residue and the malfunction of the feed valve has been eliminated, as by cleaning thereof.

4 Claims, 2 Drawing Figures

OVERCHARGE PREVENTION ARRANGEMENT

BACKGROUND OF THE INVENTION

The present invention broadly relates to vacuum evaporators or vaporizers and, more specifically, pertains to a new and improved construction of an overcharge prevention arrangement for monitoring the level of a fluid surface in a vacuum evaporator of a solvent processing plant having a vacuum pump, a condenser combined with said vacuum evaporator to define a heat exchanger, a feed valve, a condensate trap, a condensate drain, a drain valve and a system of interconnecting conduits.

In solvent processing plants, solvents are reclaimed or recuperated from cleaning fluids or solutions contaminated by fats, dyes or resins by evaporation processes. In such plants, among other things, overload or overcharge, i.e. overfill, prevention devices in the form of capacitive sensors are known which, together with associated electronic circuitry and a feed valve, regulate the level of the fluid charge in the vacuum evaporator. The cleaning solution is drawn through a supply or delivery conduit into the vaporizing space by a vacuum prevailing in the vacuum evaporator. The solvent is evaporated or vaporized out of the cleaning fluid or solution at low temperature. The vapors are compressed to more positive values of pressure by the vacuum pump and delivered to the condensation space of the heat exchanger where they condense or precipitate on the wall surfaces. The condensate drains continuously and unpressurized and is recycled as fully reclaimed solvent. The residue collecting in the lower portion of the vacuum evaporator during operation is periodically drained through a drain valve, usually in a viscous state, and delivered to a waste collecting means. The previously mentioned capacitive sensor is installed in the evaporating or vaporizing space or chamber of the heat exchanger and monitors the level of the surface of the cleaning fluid or solution. If the fluid surface reaches the prescribed upper or maximum level, the sensor responds, the feed valve is closed and the delivery of further cleaning solution is inhibited. The disadvantages of this device are that the electronic sensor elements do not respond to all media and that additional costly protective measures must be taken for explosion-proof designs.

Non-electronic, float-controlled feed valves are known in which a spherical float body monitors the level of the fluid surface and regulates the delivery of cleaning solution. The disadvantage of this overcharge prevention device is that the cleaning solution flowing through the feed valve can influence the functionality of the feed valve. In the course of time, contamination can accrete in the interior of the feed valve and hinder or prevent perfect closure of the feed valve.

SUMMARY OF THE INVENTION

Therefore, with the foregoing in mind, it is a primary object of the present invention to provide a new and improved construction of an overcharge prevention arrangement which does not exhibit the aforementioned drawbacks and shortcomings of the prior art constructions.

Another and more specific object of the present invention aims at providing a new and improved construction of an overcharge prevention arrangement of the previously mentioned type which functions in an explosion-proof manner and independently of the type of medium and which interrupts the delivery as soon as a certain level of the medium is exceeded when, for instance, a feed valve malfunctions.

Yet a further significant object of the present invention aims at providing a new and improved construction of an overcharge prevention arrangement of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the overcharge prevention arrangement of the present invention is manifested by the features that it comprises a conduit extending between the vacuum evaporator and the vacuum pump and having a connection with the vacuum evaporator. An overcharge valve is installed between the feed valve and the connection of the conduit to the vacuum evaporator. The overcharge valve is held in a closed position sealing a vacuum by a gravity-generated force. This force is transmitted from a float body arranged on a first end of a double-arm lever and by a valve plunger hinged to a second end of the double-arm lever to a free-floating ball valve and thence to a valve seat. The overcharge valve is held in an open position which breaks the vacuum by the buoyant action of the fluid acting upon the float body.

The advantages realized by the invention consist essentially in that the overcharge prevention arrangement operates in explosion-proof manner, is resistant to solvents and can be employed for any solvent medium and interrupts the ingestion of further solvent by breaking the vacuum in the vacuum evaporator without any components of the overcharge valve, with the exception of the float body, coming into contact with the cleaning fluid or solution. A possible contamination of the float body is not detrimental to the functionality of the overcharge valve. On the contrary, the closure force of the valve would even be increased by such contamination.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
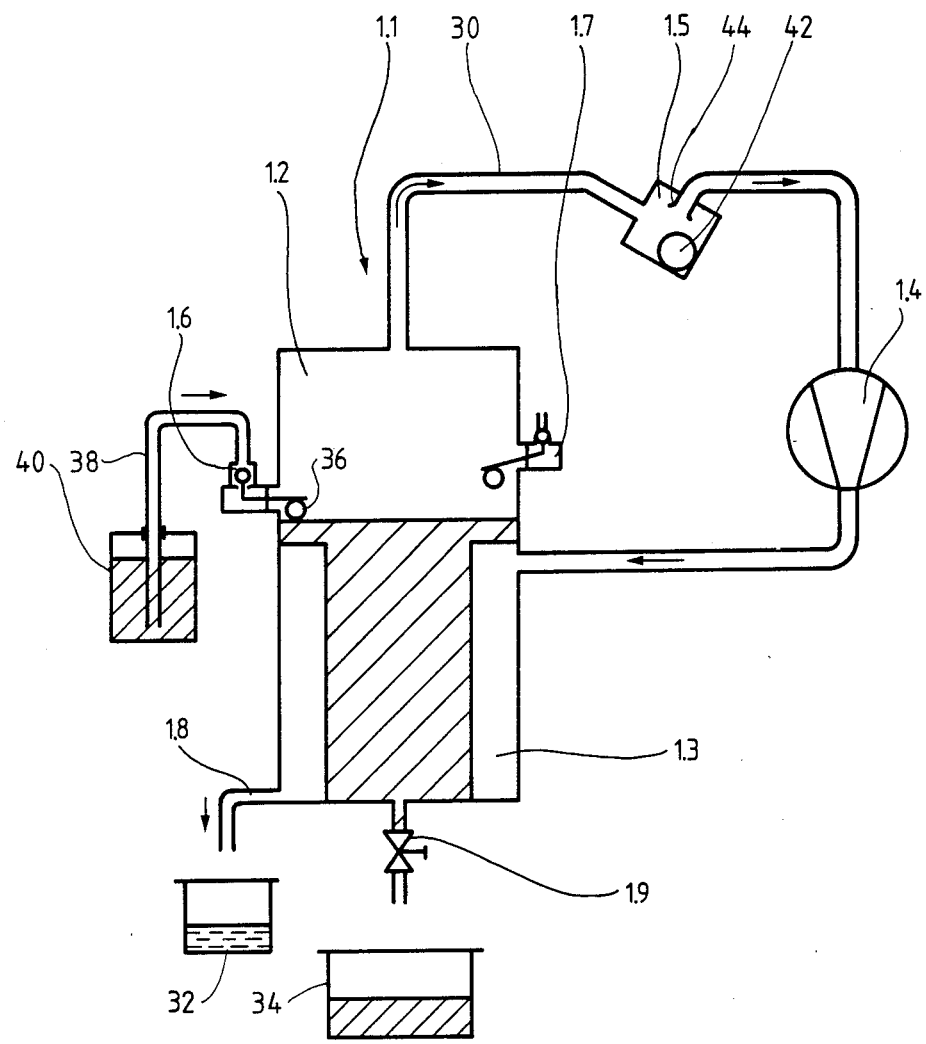
FIG. 1 schematically illustrates a solvent processing plant.

Describing now the drawings, it is to be understood that to simplify the showing thereof only enough of the structure of the overcharge preventing arrangement has been illustrated therein as is needed to enable one skilled in the art to readily understand the underlying principles and concepts of this invention. Turning now specifically to FIG. 1 of the drawings, the arrangement illustrated therein by way of example and not limitation will be seen to comprise a heat exchanger designated with the reference numeral 1.1 which, in turn, comprises a vacuum evaporator or vaporizer 1.2 and a condenser 1.3. A vacuum pump is designated with the reference numeral 1.4 and a condensate trap installed in a conduit 30 between the vacuum evaporator or vaporizer 1.2 and the vacuum pump 1.4 is designated with the reference numeral 1.5. A filler or feed or delivery valve 1.6 and an overcharge valve 1.7 monitor the level of the fluid surface of a cleaning fluid or solution in the vacuum evaporator or vaporizer 1.2. The condensate drains into a collection or catch container 32 through a condensate drain 1.8. The residue collecting in the lower portion of the vacuum evaporator 1.2 can be drained through a drain valve 1.9 into a waste disposal container 34 or the like.

Figure 2:
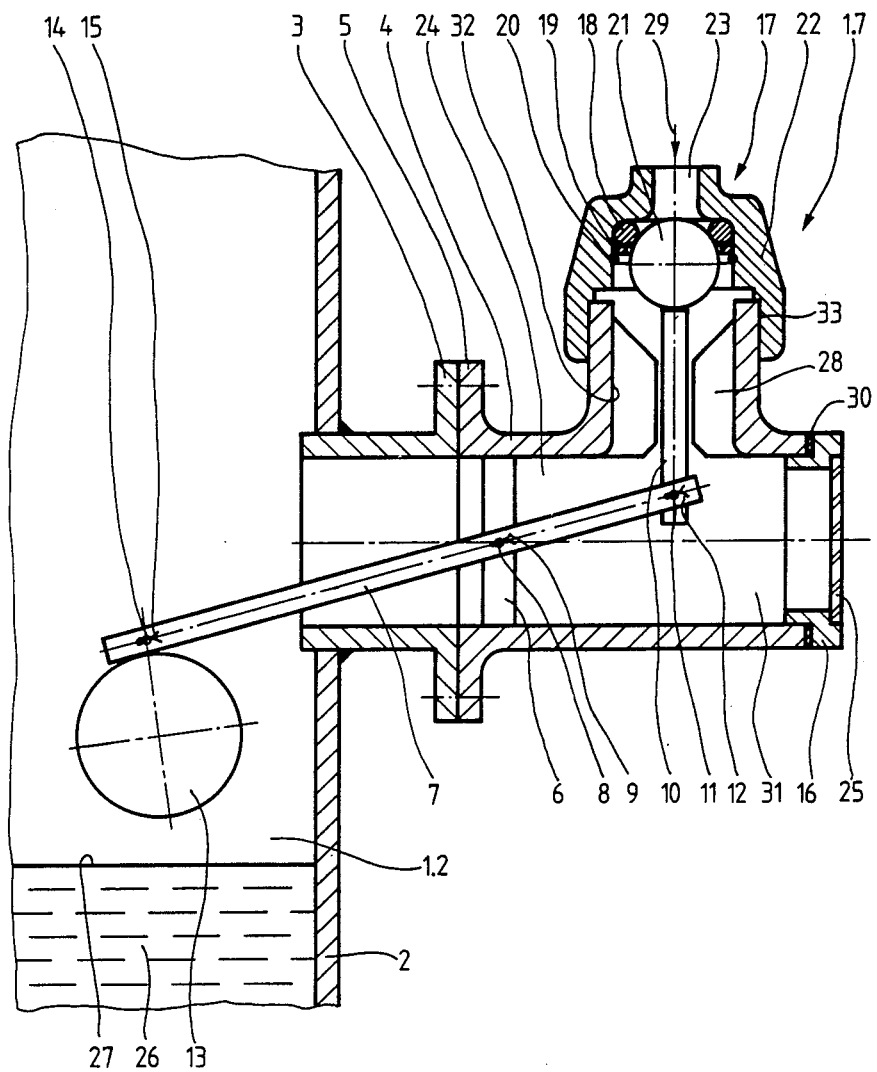
FIG. 2 is a section through an overcharge valve illustrated in its installed position.

The vacuum evaporator of the heat exchanger 1.1 is again designated with the reference numeral 1.2 in FIG. 2. A housing of the heat exchanger 1.1 is designated with the reference numeral 2 and a connection flange of the heat exchanger 1.1 is designated with the reference numeral 3. A housing of the overcharge valve 1.7 is designated with the reference numeral 4; it comprises a cylindrical horizontal portion 31 and a likewise cylindrical vertical portion 32 arranged substantially perpendicular thereto and oriented upwardly. A housing flange 5 is provided at one side of the horizontal portion 31 and a cover ring or bezel 16 is provided at the other side. The housing flange 5 of the housing 4 is fastened to the connection flange 3 of the vacuum evaporator 12. The horizontal portion 31 of the housing 4 open on the side of the housing flange 5 is designated as the outlet 24. A web member 6 is fixed within the outlet 24 of the overcharge valve 1.7. A double-arm lever 7 is rotatably mounted on the web member 6 by means of a bearing or journal pin 8. The bearing or journal pin 8 is retained by two split cotters or retaining pins 9. A valve rod or plunger 10 is hinged to one end of the double-arm lever 7 by a hinge or connecting pin 11. The hinge or connecting pin 11 is retained at both ends by a split cotter or retaining pin 12. A float body, for instance a substantially spherical float body 13 is fixed to the other end of the double-arm lever 7 by means of a further hinge or connecting pin 14. The hinge or connecting pin 14 is retained at each side by a split cotter or retaining pin 15. A gasket 30 is inserted between the cover ring or bezel 16 and the horizontal portion 31 of the housing 4. The cover ring or bezel 16 retains a sight glass 25.

A cover or cap 22 is screwed onto a male thread 33 on the vertical portion 32 of the housing 4. A valve 17 with an annular elastic valve seat 18, e.g. an O-ring, and an inlet port 23 are arranged in the cover or cap 22. The elastic valve seat 18 inserted into a bore of the cover or cap 22 is retained by a support washer 19 and a retainer or snap ring 20. A free-floating valve, such as a ball valve 21 is inserted above the vertical portion 32 of the housing 4 between the valve plunger 10 and the valve seat 18. Ribs 28 are provided in the vertical portion 32 of the housing 4 for concentrically guiding the valve plunger 10. These ribs 28 additionally limit the lower position of the ball valve 21 when the valve plunger 10 is lowered. The cleaning fluid or solution present in the vacuum evaporator 1.2 is designated with the reference numeral 26 and the level of the surface of the cleaning fluid or solution is designated with the reference numeral 27. The air ingested by the overcharge valve 1.7 is designated with the reference numeral 29.

The previously described arrangement operates as follows:

The overcharge prevention arrangement integrated into the solvent processing plant (cf. FIG. 1) is to be understood as a combination of the overcharge valve 1.7 and the condensate trap 1.5 and becomes effective when a feed valve 1.6. or equivalent structure malfunctions. The overcharge prevention arrangement assures that the level 27 of the surface of the cleaning or washing fluid or solution 26 does not exceed a certain value or height. It further assures that no cleaning fluid or solution 26 can get into the vacuum pump 1.4 and that the vacuum pump 1.4 continues to operate in the idle or unloaded state after the overcharge valve 1.7 has responded.

The position of the overcharge valve 1.7 in the vacuum evaporator 1.2 is chosen such that the highest level 27 of the cleaning fluid or solution 26 in normal operation does not reach the substantially spherical float body 13 of the overcharge valve 1.7. The substantially spherical float body 13 is freely suspended in the air or vacuum space of the vacuum evaporator 1.2 and presses the valve plunger 10 against the ball valve 21 through the double-arm lever 7.

The ball valve 21, in turn, presses against the elastic valve seat 18 and seals the inlet passage or port 23 against the admission of air 29. In this state, the level 27 of the cleaning fluid or solution 26 in the vacuum evaporator 1.2 is, for instance, monitored by a substantially spherical float body 36 of the feed valve 1.6 which regulates the delivery of cleaning fluid or solution in relation to the evaporation of the solvent, respectively in relation to the drainage of the residue collecting in the lower portion of the vacuum evaporator 1.2 over the course of time.

The cleaning fluid or solution 26 is sucked or ingested by the vacuum generated in the vacuum evaporator 1.2 by means of a hose or conduit 38 through the feed valve 1.6 out of a container 40 into the vacuum evaporator 1.2. If the level of the cleaning fluid or solution 26 exceeds the level monitored by the substantially spherical float body 36 of the feed valve 1.6 due to a malfunction of the feed valve 1.6 without the delivery of further cleaning fluid or solution being inhibited, the surface of the cleaning fluid or solution reaches the substantially spherical float body 13 of the overcharge valve 1.7 and buoyant action displaces the substantially spherical float body 13 upwardly. The upward motion of the substantially spherical float body 13 causes the valve plunger 10 to be drawn downward by the double-arm lever 7. The ball valve 21 is no longer pressed against the valve seat 18 and the overcharge valve 1.7 opens.

Before the fluid surface of the cleaning fluid or solution reaches the connection flange 3 of the vacuum evaporator 1.2, air enters through the inlet 23 of the overcharge valve 1.7 into the vacuum evaporator 1.2. The vacuum generated in the vacuum evaporator 1.2 collapses, the suction force employed for delivering the cleaning fluid or solution degenerates and no further cleaning fluid or solution is sucked or ingested into the vacuum evaporator 1.2.

A ball valve 42 present in the condensate trap 1.5 installed between the vacuum pump 1.4 and the vacuum evaporator 1.2 is drawn against an associated valve seat 44 simultaneously with the collapse of the vacuum in the vacuum evaporator 1.2. The vapor supply conduit 30 to the vacuum pump 1.4, respectively the conduit 30 between the vacuum pump 1.4 and the vacuum evaporator 1.2, is therefore blocked. The vacuum pump 1.4 continues to run idly. This state persists until the level of the cleaning fluid or solution is lowered by draining the residue collecting in the lower portion of the vacuum evaporator 1.2 and until the malfunction, for instance caused by a heavily contaminated and no longer functional feed valve 1.6, is eliminated. The position and state of the valve plunger 10 and double-arm lever 7 installed in the overcharge valve 1.7 can be examined through the sight glass 25.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. In an overflow prevention arrangement for monitoring the level of a fluid surface in a vacuum evaporator of a solvent processing plant having a vacuum pump, a condenser combined with said vacuum evaporator, a feed valve, a condensate trap containing a ball valve, a condensate drain and a drain valve, the improvement which comprises:

an overcharge valve arranged in the vacuum evaporator;
said overcharge valve including:
a double-arm lever having a first end and a second end;
a float body arranged upon said first end of said double-arm lever and being acted upon by gravity to generate a weight force;
a valve plunger hinged to said second end of said double-arm lever;
a free-floating valve;
a valve seat cooperating with said free-floating valve;
the overcharge valve being held in a closed position sealing a vacuum by said weight force transmitted from said float body by said valve plunger through said free-floating valve to said valve seat;
said fluid surface exerting a buoyant action upon said float body; and
the overcharge valve being placed in an open position breaking said vacuum by said buoyant action upon said float body.

2. The improvement as defined in claim 1, further including:
a system of conduits including a conduit extending between said vacuum evaporator and said vacuum pump;
said conduit having a connection with the vacuum evaporator; and
said overcharge valve being arranged in the vacuum evaporator between said feed valve and said connection of the conduit with the vacuum evaporator.

3. The improvement as defined in claim 1, wherein: said float body is substantially spherical.

4. The improvement as defined in claim 1, wherein: said free-floating valve comprises a ball valve.

* * * * *

UNITED STATES PATENT AND TRADEMARK OFFICE
CERTIFICATE OF CORRECTION

PATENT NO. : 4,561,940

DATED : December 31, 1985

INVENTOR(S) : RENE MEIER

It is certified that error appears in the above—identified patent and that said Letters Patent is hereby corrected as shown below:

Column 3, line 31, delete "12" and insert --1.2--.

Signed and Sealed this

Eleventh Day of March 1986

[SEAL]

Attest:

DONALD J. QUIGG

Attesting Officer

Commissioner of Patents and Trademarks